(12) United States Patent
Miller et al.

(10) Patent No.: US 9,311,373 B2
(45) Date of Patent: Apr. 12, 2016

(54) TAXONOMY DRIVEN SITE NAVIGATION

(71) Applicant: Microsoft Technology Licensing, LLC, Redmond, WA (US)

(72) Inventors: Patrick Carl Miller, Sammamish, WA (US); Peter Blair Gonzalez del Solar, Bellevue, WA (US); Daniel E. Kogan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 13/730,577

(22) Filed: Dec. 28, 2012

(65) Prior Publication Data

US 2014/0136572 A1    May 15, 2014

Related U.S. Application Data

(60) Provisional application No. 61/724,828, filed on Nov. 9, 2012.

(51) Int. Cl.
*G06F 17/30* (2006.01)
*G06F 17/22* (2006.01)

(52) U.S. Cl.
CPC ...... *G06F 17/30572* (2013.01); *G06F 17/2247* (2013.01); *G06F 17/30887* (2013.01)

(58) Field of Classification Search
CPC ............ G06F 17/2247; G06F 12/1036; G06F 12/109; G06F 17/30917; G06F 17/30864
USPC ................... 707/E17.014, E17.108, E17.044, 707/E17.005, 706, 709, 770, E17.107, 705, 707/737, 769, 803, 823, E17.007, E17.01, 707/E17.012, E17.019, E17.032, 609, 692, 707/722, 723, 731, 733, 738, 740, 748, 778, 707/794, 797, 804; 709/204, 223, 201, 206, 709/226, 205, 219, 220, 224, 228; 715/234, 715/760, 255, 704, 747, 751, 825; 705/14.66, 14.49, 26.7, 14.4, 14.42, 705/14.44, 14.45, 14.48, 14.53, 14.61, 705/14.63, 14.71, 1.1, 26.1, 313, 38, 50, 705/500, 59, 71, 7.31, 7.37, 80
See application file for complete search history.

(56) References Cited

U.S. PATENT DOCUMENTS 6,055,515 A    4/2000   Consentino et al.
6,085,187 A    7/2000   Carter et al.
(Continued)

OTHER PUBLICATIONS

Wang, Xaiomei et al., "Add automatic content classification to your IBM FileNet P8", found online at: http://www.ibm.com/developerworks/data/library/techarticle/dm-0801wag/, Jan. 31, 2008, 26 pgs.
(Continued)

*Primary Examiner* — Jay Morrison
*Assistant Examiner* — Ken Hoang
(74) *Attorney, Agent, or Firm* — Tom Wong; Julie Kane Akhter; Micky Minhas

(57) ABSTRACT

Embodiments of the present disclosure provide a method and system for generating a uniform resource locator using one or more terms in a hierarchical taxonomy. Specifically, embodiments disclosed herein provide receiving a plurality of terms for a term set and generating a hierarchical taxonomy for the term set using the plurality of terms. Once the hierarchical taxonomy has been generated, a navigation property may be assigned to at least one term in the plurality of terms. A navigation term set that mirrors the properties of the hierarchical taxonomy is then created using the at least one term.

20 Claims, 14 Drawing Sheets

(56) References Cited

U.S. PATENT DOCUMENTS

| | | | |
|---|---|---|---|
| 6,317,142 | B1 | 11/2001 | Decoste et al. |
| 6,578,078 | B1* | 6/2003 | Smith et al. ............... 709/224 |
| 7,013,289 | B2 | 3/2006 | Horn et al. |
| 7,082,426 | B2 | 7/2006 | Musgrove et al. |
| 7,689,625 | B2 | 3/2010 | Westerinen et al. |
| 7,823,208 | B2 | 10/2010 | DeMello et al. |
| 7,921,097 | B1* | 4/2011 | Dandekar et al. ........... 707/707 |
| 8,019,659 | B2 | 9/2011 | Musgrove et al. |
| 8,122,005 | B1* | 2/2012 | Juang et al. ............... 707/710 |
| 8,126,908 | B2 | 2/2012 | Vasudevan et al. |
| 8,918,466 | B2 | 12/2014 | Yu |
| 2001/0044758 | A1 | 11/2001 | Talib et al. |
| 2002/0065857 | A1 | 5/2002 | Michaelewics et al. |
| 2003/0009564 | A1 | 1/2003 | Eckel |
| 2003/0182196 | A1 | 9/2003 | Huang |
| 2004/0148503 | A1* | 7/2004 | Sidman ............... H04L 63/0428 713/167 |
| 2004/0236714 | A1 | 11/2004 | Eisenberger et al. |
| 2005/0071362 | A1 | 3/2005 | Nelson et al. |
| 2006/0095345 | A1 | 5/2006 | Ka et al. |
| 2006/0136309 | A1 | 6/2006 | Horn et al. |
| 2006/0235870 | A1 | 10/2006 | Musgrove |
| 2007/0100829 | A1 | 5/2007 | Allen et al. |
| 2007/0168938 | A1* | 7/2007 | Sturov ............... H04L 29/12594 717/108 |
| 2007/0250487 | A1 | 10/2007 | Reuther |
| 2007/0260520 | A1 | 11/2007 | Jha et al. |
| 2009/0083211 | A1* | 3/2009 | Sinha et al. ............... 706/50 |
| 2009/0248672 | A1 | 10/2009 | McIntire et al. |
| 2010/0036789 | A1 | 2/2010 | Marleau |
| 2010/0185577 | A1 | 7/2010 | Tsaparas et al. |
| 2011/0029475 | A1 | 2/2011 | Gionis et al. |
| 2011/0106808 | A1* | 5/2011 | Hersans et al. ............... 707/740 |
| 2012/0265744 | A1 | 10/2012 | Berkowitz et al. |
| 2012/0297278 | A1 | 11/2012 | Gattani et al. |
| 2013/0124755 | A1* | 5/2013 | Haywood et al. ............. 709/238 |
| 2013/0198234 | A1 | 8/2013 | Miller et al. |
| 2014/0136569 | A1 | 5/2014 | Miller et al. |
| 2014/0136948 | A1 | 5/2014 | Miller et al. |

OTHER PUBLICATIONS

Layer 2, SharePoint 2010, "Taxonomy Manager for SharePoint Server 2010—Features & Benefits", found online at: http://www.layer2.de/en/products/Pages/Taxonomy-Manager-SharePoint-2010.aspx, Oct. 15, 2010, 11 pgs.

Microsoft Office, "Create and manage terms within term sets", found online at: http://office.microsoft.com/en-us/sharepoint-server-help/create-and-manage-terms-within-term-sets-HA101631581.aspx, Mar. 5, 2012, 6 pgs.

Shirky, Clay, "Ontology is Overrated: Categories, Links, and Tags", online at: http://shirky.com/writings/ontolgy_overrated.html, May 18, 2005, 18 pgs.

Clifton, Brian, "Roll up reporting in Google Analytics", online at: http://www.advanced-web-metrics.com/blog/2009/03/30/roll-up-reporting-in-google-analytics/, Apr. 2, 2009, 5 pgs.

Kintera Sphere Release Notes, Version 7.1.3, online at: http://www.kintera.org/htmlcontent.asp?cid=40914, Nov. 5, 2004, 6 pgs.

Ektron Inc., eCommerce Products, online at: http://documentation.ektron.com/cms400/v8.50/Reference/Rev2/Web/eCommerce/eCommerce_products_intro.htm#eCommerce_catalog_folder_2283343617_1008880, Aug. 17, 2012, 5 pgs.

Wordpress, "Roll up the list of pages in the admin backend", online at: http://wordpress.org/support/topic/roll-up-the-list-of-pages-in-the-admin-backend, Aug. 17, 2012, 1 pg.

MSDN Magazine, "Building Information Architecture in SharePoint 2010", online at: http://msdn.microsoft.com/en-us/magazine/hh456396.aspx, Aug. 17, 2012, 12 pgs.

IBM, IBM Web Content Manager, 3rd Edition, published Apr. 2011, online at: http://infolib.lotus.com/resources/portal/7.0.0/doc/en_us/pt700abd004/html-wrapper-wan.html, 424 pgs.

Cruz, Flavio Manuel Fernandez, "BioSeD—Biological Sequences Database", online at: http://www.cs.smu.edu/~fmfernan/files/biosed-report.pdf, Nov. 23, 2010, 102 pgs.

Hewlett Packard, HP SOA Systinet Workbench, Software Version 2.52, document release date Nov. 2007, Software release date Nov. 2007, online at: http://www.google.co.in/url?sa=t&rct=j&q=content%20management%20system%20uses%20taxonomy%2Ftagging%20system%20to%20represent%20data%20for%20uniform%20resource%20locator%20%28url%29%20namespace%20and%20navigation%20menu%20tree%20source=web&cd=rja&ved=0CE4QFjAG&url=https%3A%2F%2Fserviceregister.overheid.nl%2Fsoa%2Fsystinet%2Fplafform%2Fdoc%2Fpdf%2Ftaxonomy-, 57 pgs.

Davulcu, H. et al., "DataRover: A Taxonomy Based Crawler for Automated Data Extraction from Data-Intensive Websites", Proceedings of the ACM International Workshop on Web Information and Data Management, online at: http://www.public.asu.udu/~hdavulcu/45-ukksueukod.pdf, Nov. 8, 2003, 6 pgs.

Binns, David et al., "QuickGo: a web-based tool for Gene Ontology searching", BioInformatics, vol. 25, No. 22, 2009, pp. 3045-3046, retrieved on Feb. 18, 2014, retrieved on the internet at: http://bioinformatics.oxfordjournals.org/content/25/22/3045.full.pdf+html.

U.S. Appl. No. 13/607,174, Office Action mailed Feb. 25, 2014, 13 pgs.

U.S. Appl. No. 13/730,621, Office Action mailed Dec. 3, 2014, 15 pgs.

U.S. Appl. No. 13/607,174, Office Action mailed Feb. 26, 2015, 18 pgs.

U.S. Appl. No. 13/730,437, Office Action mailed Mar. 31, 2015, 25 pgs.

"User Friendly URL—rule template", The Official Microsoft IIS Site, ASPNET.pdf, Sep. 11, 2008, obtained online on Feb. 11, 2015 at: http://iis.net/learn/extensions/url-rewrite-module/user-friendly-url-rule-template, 6 pgs.

U.S. Appl. No. 13/730,621, Amendment and Response filed Apr. 1, 2015, 11 pgs.

U.S. Appl. No. 13/730,621, Office Action mailed Apr. 18, 2015, 20 pgs.

U.S. Appl. No. 13/730,437, Office Action mailed Sep. 24, 2015, 33 pgs.

U.S. Appl. No. 13/730,437, Amendment and Response filed Jul. 31, 2015, 10 pgs.

U.S. Appl. No. 13/730,621, Amendment and Response filed Jul. 1, 2015, 14 pgs.

U.S. Appl. No. 13/607,174, Amendment and Response filed Jun. 25, 2014, 14 pgs.

Rahui, Zane, "Managed Navigation—SP 2013", online at: http://zane-rahui.com/blog/managed-navigation, Jul. 19, 2012, 2 pgs.

U.S. Appl. No. 13/730,437, Amendment and Response filed Dec. 21, 2015, 11 pgs.

* cited by examiner

300

| | | |
|---|---|---|
| Taxonomy Term Name (i.e., default label): | Products | |
| Taxonomy Description: | This is the main products category, which is synchronized with the e-commerce system. Check with David before editing any titles in this term set. | |
| | [ x ] This term is available for tagging | ⎯ 305 |
| Navigation Menu Item Title: | Our Products | [ x ] Customize |
| Navigation Menu Item Hover Text: | Welcome to the Example.com store! | |
| Physical URL: | http://example.com/Pages/Products.aspx | |
| Node Type: | ( ) Simple Link    ( x ) Friendly URL | ⎯ 310 |
| Friendly URL Segment: | products | [ ] Customize |

| Taxonomy Term Name (i.e., default label): | Products | |
|---|---|---|
| Taxonomy Description: | This is the main products category, which is synchronized with the e-commerce system. Check with David before editing any titles in this term set. | |
| | [ x ] This term is available for tagging | |
| Navigation Menu Item Title: | Our Products | [ x ] Customize |
| Navigation Menu Item Hover Text: | Welcome to the Example.com store! | |
| | [ ] Hide From Top Menu | |
| | [ ] Hide From Left Menu | |
| Node Type: | ( ) Simple Link    ( x ) Friendly URL | |
| Friendly URL Segment: | products | [ ] Customize |
| Physical URL for this Term: | http://example.com/Pages/Products.aspx | [ x ] Customize |
| Default Physical URL for Child Terms: | http://example.com/Pages/ProductsTemplate.aspx | [ x ] Customize |

| Taxonomy Term Name (i.e., default label): | Electronics | |
|---|---|---|
| Taxonomy Description: | The Electronics section will be revamped in January. Check with David before updating these terms. | |
| | [ x ] This term is available for tagging | |
| Navigation Menu Item Title: | Electronics | [ ] Customize |
| Navigation Menu Item Hover Text: | Check out these amazing electronics! | |
| | [ ] Hide From Top Menu | |
| | [ ] Hide From Left Menu | |
| Node Type: | ( ) Simple Link    ( x ) Friendly URL | |
| Friendly URL Segment: | electronics | [ ] Customize |
| Physical URL for this Term: | http://example.com/Pages/ProductsTemplate.aspx | [ ] Customize |
| Default Physical URL for Child Terms: | http://example.com/Pages/ElectronicsTemplate.aspx | [ x ] Customize |

| | | |
|---|---|---|
| Taxonomy Term Name (i.e., default label): | Products | |
| Taxonomy Description: | This is the main products category, which is synchronized with the e-commerce system. Check with David before editing any titles in this term set! | |
| | [ x ] This term is available for tagging | |
| Navigation Menu Item Title: | Our Products | [ x ] Customize |
| Navigation Menu Item Hover Text: | Welcome to the Example.com store! | |
| | [ ] Hide From Top Menu | |
| | [ ] Hide From Left Menu | |
| Node Type: | ( ) Simple Link    ( x ) Friendly URL | |
| Friendly URL Segment: | products | [ ] Customize |
| Physical URL for this Term: | http://example.com/Pages/Products.aspx | [ x ] Customize |
| Default Physical URL for Child Terms: | http://example.com/Pages/ProductsTemplate.aspx | [ x ] Customize |
| Catalog Page for this Term | | [ ] Customize |
| Default Catalog Page for Child Terms: | http://example.com/Pages/ItemTemplate.aspx | [ x ] Customize |

| Title | Red Sofa |
|---|---|
| Item Number | SKU1096 |
| | The unique identifier for each distinct item. |
| Rollup Image | Select a Picture from SharePoint |
| Item Category | Furniture |
| Price | 899 |
| Summary | This durable red sofa creates a relaxed and sophisticatd atmosphere for your room. |
| Image | http://catalog.examle/Images/RedSofa.jpg |

FIG. 7B

TAXONOMY DRIVEN SITE NAVIGATION

CROSS-REFERENCE TO RELATED APPLICATIONS

The current application claims priority to U.S. Provisional Application No. 61/724,828 (now expired) filed on Nov. 9, 2012, entitled "Taxonomy Driven Site Navigation, Page Model and Commerce Site" which is incorporated by reference herein in its entirety.

BACKGROUND

Modern content management systems rely heavily on hierarchies for organizing data. Such content management systems can be found in electronic commerce web sites, news publishing portals, knowledge bases, and intranet collaboration sites. Traditionally, each component of a content management system may need to be manually updated when one node in the hierarchy is updated or changed. Such changes may be demanding on time, cost and energy and may be subject to human error.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a method and system for generating a uniform resource locator using one or more terms in a hierarchical taxonomy. Specifically, embodiments disclosed herein provide receiving a plurality of terms for a term set and generating a hierarchical taxonomy for the term set using the plurality of terms. Once the hierarchical taxonomy has been generated, a navigation property may be assigned to at least one term in the plurality of terms. In certain embodiments, a navigation term set that mirrors the properties of the hierarchical taxonomy is then created using the at least one term.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following Figures in which:

FIG. 3 illustrates an exemplary user interface for displaying and editing the properties of a taxonomy term according to one or more embodiments;

FIGS. 5A and 5B illustrate exemplary user interfaces for displaying and editing the properties of a taxonomy term according to one or more embodiments;

FIG. 7A illustrates an exemplary user interface for displaying and editing the properties of a taxonomy term including catalog URLs according to one or more embodiments;

FIG. 7B illustrates an exemplary user interface for editing catalog item properties in a product database according to one or more embodiments;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Traditionally, there are three distinct components in typical content management systems. These components are: (i) the taxonomy/tagging portion, (ii) the Uniform Resource Locator (URL) namespace, and (iii) the navigation menu tree. Typically, each component has its own administrative user interface and data storage. Thus, when one item for one of the components is updated or changed, corresponding data items in each of the other components may also need to be manually updated. For example, when the phrase "used cars" is replaced with the term "pre-owned vehicles" in a given URL of the Uniform Resource Locator namespace, similar changes may need to be made to the taxonomy/tagging portion and the navigation menu tree. Continuing with the example, the updates may include: (i) updating a taxonomy term of "Used Cars" to "Pre-owned Vehicles", (ii) updating the web page URLs from, for example, "http://example.com/used-cars/2008-camry" to a pattern such as "http://example.com/pre-owned/2008-camry", and (iii) updating a navigation menu tree. As used herein, a navigation menu tree is a hierarchy of page titles with hyperlinks that is used to drive the website menus, the breadcrumbs (e.g. "Vehicles>Pre-owned Vehicles>Camry"), the site map page (i.e., a summary page that shows the entire menu hierarchy in a flat list), and other navigation controls.

Based on the above, embodiments described herein describe a taxonomy/tagging system that is used to represent data for all components in a content management system. That is, data in the taxonomy/tagging system is used to represent and build the navigation menu tree and a URL of a given site. Accordingly, when data in the content management system is updated or changed, the need for manually updating each component in the content management system may be eliminated as the updates are automatically performed. For example, when a taxonomy term is renamed, the corresponding URL and an associated node in navigation menu tree are automatically updated.

Figure 1:
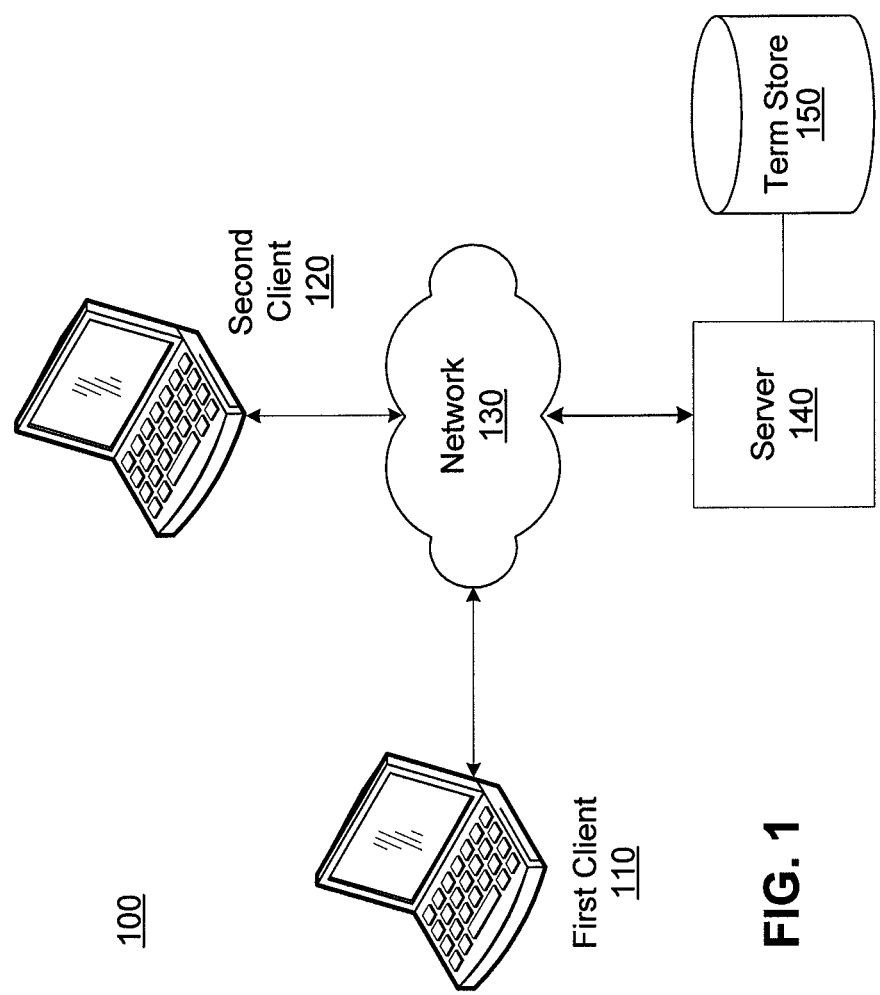
FIG. 1 illustrates a system for accessing, generating, and editing terms in a term store of a hierarchical taxonomy according to one or more embodiments.

FIG. 1 illustrates a system 100 for accessing, generating, and editing a term store arranged in a hierarchical taxonomy according to one or more embodiments. In certain embodiments, a term store contains multiple security groups. Each security group contains multiple term sets, and each term set contains a hierarchy of terms.

In embodiments described herein, a term acts as a classification tag that can be applied to documents, photos, or other content objects. For example, a news article about the Seattle Mariners might be tagged with the terms "Baseball" and "Washington." Such tagging associates the article with those keywords in the context of a search box or other taxonomy-enabled control.

Terms in a term set are organized in a hierarchy. For example, the term "Baseball" could be a child of the term "Sports," and the term "Washington" could be a child of the term "United States", which is a child of the term "North America." Within a term set, this hierarchy of terms can be arbitrarily deep. However, a term is more than just a name. A term is a rich object that can store alternative text labels, such as, for example, synonyms or international language translations, an informative description, ownership/permission information, and even user-defined freeform key/value data.

Referring back to FIG. 1, the system 100 includes a first client 110 and a second client 120. In certain embodiments, the first client 110 and the second client 120 may access a server 140 over a network connection 130. Although two clients are shown, it is contemplated that fewer or additional clients may access the server 140 through the network connection 130. The server 140 maintains a term store 150 in which managed metadata is stored in the form of term sets and terms. Each term may include one or more properties with each property having an associated value. In certain embodiments, a particular term may be reused in various term sets. A term is reused when the term, or a property of that term, is associated with or has a membership in multiple locations or term sets.

Embodiments described herein also use terms as a representation of navigation menu tree nodes and as a way to assign URLs for content items (e.g. web pages). Terms used as representations of navigation menu tree nodes are called navigation terms and belong to a navigation term set. In embodiments, a structure or hierarchy of one navigation term set may be pinned to (i.e., mirror) a structure or hierarchy of the terms set from which the navigation term set is derived. Additionally, properties of the terms in the navigation term set may mirror, at least some, if not all, of the property of the terms in the original term set. That is, each of the terms, as well as the properties of those terms, in the navigation term set are similar to those terms in the original term set. However, it is contemplated that other embodiments provide the arrangement of the terms in the hierarchy may be different in the navigation term when compared against the structure and arrangement of the terms in the original term set. In yet other embodiments, the navigation term set may simply be the term set in the term store but identified as both a navigation term set and a "regular" term set (i.e., a term set that is not a navigation term set).

The following table, Table 1, illustrates a sample term store (Example.com Store) containing an exemplary navigation term set called "Example.com Hierarchy." The "Example.com Hierarchy" represents a navigation menu and the URLs for an example.com web site.

TABLE 1

| Term Store | Term set | Term | Term |
|---|---|---|---|
| Example.com Store | | | |
| | Example.com Hierarchy | | |
| | | About Us | |
| | | Products | |
| | | | Electronics |
| | | | Furniture |
| | | | Outdoors |
| | | Contact | |

As shown in Table 1, the name of the term set is "Example.com Hierarchy." The term set includes six terms: "About Us," "Products," "Electronics," "Furniture," "Outdoors," and "Contact." The terms in the term set are arranged in a hierarchical manner. Accordingly, a first term of the term set may be a parent or child of another term in the term set. Additionally, each child term in the term set may inherit one or more properties from the parent term in the term set. In embodiments, where a term in a term set is a global term, that term may inherit one or more properties that are available globally. As each of the terms are organized into a hierarchical structure, changes to various properties of one term may be sent through to all terms. Additionally, changes to various parent-child relationships may also be propagated throughout the entire structure.

For example, in Table 1 above, the terms "Electronics," "Furniture," and "Outdoors" are child terms of the term "Products." Thus, if one or more properties of the term "Products" is changed, those changes would be propagated to the terms "Electronics," "Furniture," and "Outdoors" as each of those terms are children of the term "Products." In another example, if the term "Electronics" was moved in the hierarchy from being a direct child of the term "Products" to a new term called "Home Electronics" the parent/child relationship between "Electronics" and "Products" would automatically be updated. That is, when the term is moved or renamed, this change is also seen as a change in an associated navigation menu. For example, this update would include automatically updating the taxonomy but also automatically updating the associated URL and navigation menu item. Similarly, if a new term "Computers" was added as a child node of "Electronics" similar changes would be automatically made to the other components of the taxonomy system as was previously discussed.

Referring again to the terms in the taxonomy, each term may have one or more properties. Additionally, a term property may be a local term property or a global term property. A global term property is a property that is associated with every instance of a term, regardless of which term set the term is used in or reused in. In contrast, a local term property is a property that is associated with a term only in the context of the term set in which it was applied to the term.

In certain embodiments, each level in the hierarchical taxonomy may be accessible by different clients. For example, if the hierarchical taxonomy is formatted as a tree structure, with each node in the tree representing a term, one client may have access to a first level of the tree, including all sub-nodes associated with the first level of the tree, while a second client may have access to a second level of the tree including all sub-nodes associated with the second level of the tree but not have access to the first level of the tree including those nodes included on the first level and above.

In embodiments, the various nodes in the structure may be added, deleted or modified. Additionally, security permissions for the content management system may be implemented. In embodiments, the security permissions may be in the form of a standard access control list (ACL) for each document or content item. Thus, for example, there might be a page called "Publishing Contacts" that is only readable by members of a security group "Authoring Team." If a visitor does not belong to the "Authoring Team" security group, a trimming feature of the present disclosure may cause the system to present an error message to the restricted visitor such as "access denied" when the visitor attempts to view the restricted page. Accordingly, this trimming feature automatically hides the navigation menu item (or more generally the navigation tree node) which also affects the bread crumb and other navigation controls for an audience or user that does not have requisite permissions.

In certain embodiments, the term store 150 stores data about each individual term set, term, and the properties associated with each term. As discussed above, the properties include whether the term is marked as a navigation term for a navigation term set. Such data may be stored in one or more tables of the term store 150. For example, the term store 150 may include a "Term" table that is populated with data about each term, such as, for example, an identifier for each term, with each row in the table representing a single term. The term store 150 may also include a "Term set" table that includes information about each term set, such as, for example, an identifier associated with each term set as well as a name of each term set. The term store 150 may also include a "Term Property" table that is populated with term properties and term set properties, such as, for example, if the terms in the term set are navigation terms.

Figure 2:
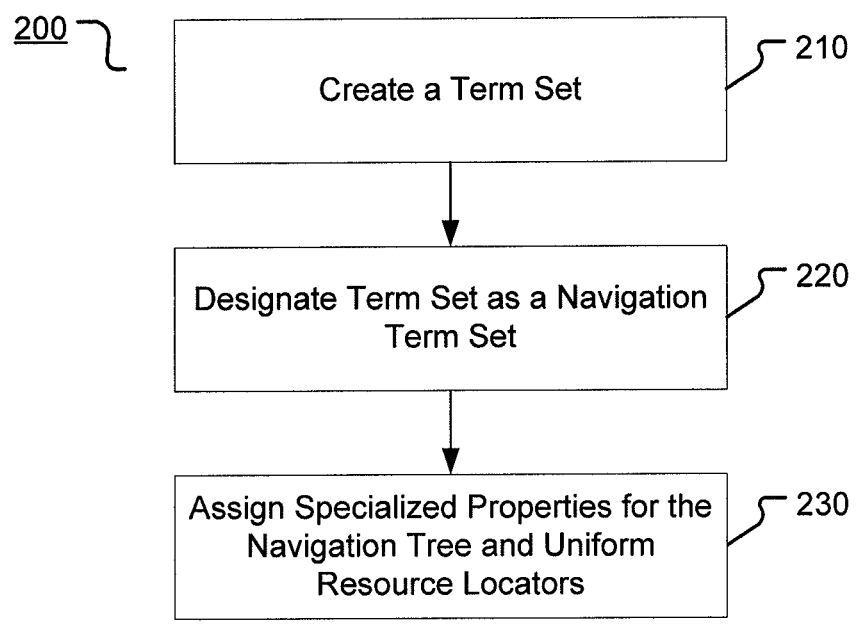
FIG. 2 illustrates a method for creating a navigation term set using a hierarchical taxonomy according to one or more embodiments.

FIG. 2 illustrates a method 200 for creating a navigation term set using a hierarchical taxonomy according to one or more embodiments. Method 200 begins at operation 210 in which a term set is created. Once created, the term set may be stored in a term store. In certain embodiments a create term set command may be invoked by a client device using, for example, a term store manager or other term management tool. The term management tool may be provided to a user of the client device to enable viewing and selection of various terms, term sets and the like. In certain embodiments, the term store manager or term management tool may be part of the SHAREPOINT platform by MICROSOFT of Redmond, Wash. Additionally, the term management tool may enable a user to search custom properties and synchronize custom properties across various local copies. The term management tool may also enable a client device to provide information about local and global terms and the properties associated with each local and global term. The term set may represent how a particular entity or business is organized, such as, for example, the way content is tagged. Additionally, the taxonomy may also show a product hierarchy as well as representing various nodes in a site navigation. For example, as will be described, settings can be applied to terms in the term set that affect site navigation as well as URLs of the site.

Once the create command is invoked, a user may be prompted to define a term set name and one or more terms of the term set. In the example shown in Table 1 above, the term set is "Example.com Hierarchy," and the terms in the term set include terms of "About Us", "Products", "Electronics", "Furniture", "Outdoors", and "Contact".

Once the term set has been created, flow proceeds to operation 220 in which the term set is designated as a navigation term set. In another embodiment, terms in an existing term set, or a new term set such as the newly created term set, may be copied, reused, or pinned into a second term set that has been designated as a navigation term set. In certain embodiments, a term set is defined as a navigation term set based on input received from a user. It is also contemplated that if a term is added to a navigation term set after the term set has been designated as such, that term is also automatically identified as a navigation term, or a term having a navigation property.

In certain other embodiments, if one term of a term set is identified as a navigation term, a copy of the term set is created and identified as a navigation term set. Additionally, each term in the newly generated navigation term set has a corresponding navigation property. In embodiments, the navigation term set has the same structure, organization and terms as the original term set from which it was created. In another embodiment, when a term in a term set is identified as a navigation term, the term set itself is identified as a navigation term set without a copy being created. As with other taxonomy hierarchies, terms in the navigation term set, as well as associated properties, may be updated, added, changed, or removed. In certain embodiments, a term store editor may enable a user to view, update, add or remove the various terms and term properties in a given term set.

Once the navigation term set has been generated, flow proceeds to operation 230 in which specialized properties for the navigation tree and uniform resource locators are assigned. Specifically, one or more friendly URLs are generated using the navigation term set. In such embodiments, the taxonomy terms in the hierarchy may be appended to each other in a hierarchical manner to define a new "friendly" URL that acts as an alias for, or maps to, an original physical URL. The physical URL is created by an authoring team and is consistent with traditional file systems. However, the friendly URL allows the URL to be presented using a concise address. Similarly, the physical URL hierarchy might reflect the authoring workflow or team ownership, whereas the friendly URL hierarchy might reflect the way customers understand a product catalog (i.e., computers are found in an electronics category, therefore, computers is a child of the term electronics). As will be discussed below, the friendly URL may be mapped to a physical URL using a taxonomy editor.

Table 2 illustrates an exemplary navigation menu item of an exemplary website, an associated taxonomy hierarchy as well as the associated physical URL. Likewise, Table 3 illustrates friendly URLs of the exemplary website with each URL being associated with a physical URL mapping.

TABLE 2

| Menu Item | Taxonomy Object |
|---|---|
| "Home" | Example.com Hierarchy |
| "About Us" | "About Us" |
| "Our Products" | "Products" |

TABLE 2-continued

| Menu Item | Taxonomy Object |
|---|---|
| "Electronics" | "Electronics" |
| "Furniture" | "Furniture" |
| "Outdoors" | "Outdoors" |
| "Contact" | "Contact" |

TABLE 3

| Menu Item | Friendly URL | Physical URL |
|---|---|---|
| "Home" | http://example.com | http://example.com/Pages/Default.aspx |
| "About Us" | http://example.com/about | http://example.com/Pages/Misc/About.aspx |
| "Our Products" | http://example.com/products | http://example.com/Pages/Products.aspx |
| "Electronics" | http://example.com/products/electronics | http://example.com/Pages/ElectronicsRollup.aspx |
| "Furniture" | http://example.com/products/furniture | http://example.com/Pages/FurnitureRollup.aspx |
| "Outdoors" | http://example.com/products/outdoors | http://example.com/Pages/OutdoorRollup.aspx |
| "Contact" | (none) | http://example.com/Forms/Contact.aspx |

As shown Table 2 above, each menu item of a given website is associated with a taxonomy term, which in turn, is associated with a physical URL. Likewise, as shown in Table 3, a friendly URL is generated based on a given term in the hierarchy. As shown in Table 3, a hierarchy of URLs is presented. For example, the term "Electronics" is a child node of "Products" in the taxonomy hierarchy and therefore, when a friendly URL that includes the term "Electronics" is generated, navigation down the hierarchy would result in a friendly URL of "http://example.com/products/electronics." More specifically, the URL of "http://example.com/products/electronics" is a child of "http://example.com/products" because it appends the URL segment "Electronics" as a suffix. In this way, the taxonomy contributes a single URL segment for the friendly URL for each term in the term set. Thus, the complete friendly URL is assembled from the chain of parent terms (i.e., "Products" and "Electronics"). As each friendly URL is mapped to a corresponding physical URL, if a user clicks on the menu item "Electronics" in the example.com website, their browser will show the friendly URL "http://example.com/products/electronics" rather than the physical URL ElectronicsRollup.aspx. Note that by contrast, the menu item "Contact" does not have a friendly URL, because it is a simple link.

Because the terms in the hierarchy are associated with a friendly URL, any changes made to the terms in the hierarchy are automatically applied to the corresponding friendly URL. Thus, for example, if the term "Home Electronics" was added as a child node to the term "Electronics", a friendly URL would be automatically generated for an associated physical URL for the newly created "Home Electronics" web page (assuming a "Home Electronics" page or a template of the page had been created). Likewise, if the term "Electronics" was moved in the hierarchy to be direct child node of the Example.com website, the new friendly URL associated with "Electronics" would be "http://example.com/electronics" instead of "http://example.com/products/electronics."

As discussed above, a navigation menu tree is a hierarchy of page titles with hyperlinks that is used to drive the web site menus, the breadcrumbs, and the site map page. The navigation breadcrumb shows the current node from the navigation menu tree. Continuing with the example above, when the friendly URL of http://example.com/products/furniture is viewed, the associated breadcrumb would be "example.com>Our Products>Furniture." However, when a site has a lot of pages, not every page needs to appear in the navigation menu or have an associated friendly URL. Accordingly, embodiments provide that these pages may be associated with a folder that contains a collection of physical URLs to be associated with a navigation term. For example, the folder "http://example.com/Pages/Press/" could be associated with a new term "Press Releases." This way, when a user views an article inside that folder (e.g., http://example.com/Pages/Press/2012-01-26.aspx) the breadcrumb would show "example.com>Press Releases" even though there is not a specific menu item for the document 2012-01-26.aspx.

One or more embodiments also provide a performance optimization that consists of a navigation cache that stores a copy of the menu items and associated URLs in a working memory of a server. Such a configuration allows the server to avoid having to repeatedly retrieve this information from the taxonomy terms.

Additional embodiments provide a link fix-up system that automatically corrects links in hypertext. For example, if a user edits the friendly URL of "http://example.com/used-cars/2008-camry" to "http://example.com/pre-owned/2008-camry," any HTML content that is referenced by the old URL will now contain broken hyperlink. Accordingly, for HTML content hosted internally by the content management system, all pages that link to the page that was updated are also automatically updated to reflect the change. Similarly, when the physical URL is changed, such as, for example, because the underlying content object was renamed, the associated taxonomy term is automatically updated with the new target URL.

One or more embodiments also provide for URL rewriting. In this approach, the web server software performs a preprocessing step at the beginning of the HTTP request, wherein the incoming friendly URL is rewritten (i.e. replaced by) the corresponding physical URL, and subsequent processing occurs as if the physical URL had been requested from the server.

FIG. 3 illustrates an exemplary user interface 300 for displaying and editing the properties of a taxonomy term. As shown in FIG. 3, the user interface 300 gives a user the opportunity to: (i) name a term in the taxonomy, (ii) give a description of the taxonomy term, (iii) name a navigation menu item for the term, (iv) create hover text for the navigation menu item, (v) input a physical URL, (vi) identify a node type, and (vii) describe the friendly URL segment that will be used to generate the friendly URL. In the exemplary user interface 300, the "Customize" box 305 is checked next to "Navigation Menu Item Title" which indicates that the phrase "Our Products" was input manually, rather than equating the "Navigation Menu Item Title" to the taxonomy term name (i.e., "Products"). By contrast, the "Customize" box 310 is unchecked for the "Friendly URL Segment" indicating that "products" is generated from the term name. In certain embodiments, the friendly URL segment is generated using a computerized formula which converts letters to lower case and removes punctuation or spacing characters. In certain embodiments, this may be required as the term name may allow characters that are illegal in URLs. Thus, such characters need to be removed or somehow encoded.

In another embodiment, a content management system may include a "roll-up" page that displays a listing of documents, photos, or other content items. These content items may be related to a specific category or topic. For example, a news web site might include a menu item "Baseball" which takes the viewer to a page that shows the top 10 most recent news stories involving baseball, and also the top 10 most popular stories involving baseball. Similarly, an e-commerce site might have a menu item "Televisions" that shows a filtering control with search results for televisions. In such cases, the navigation term set may be further configured to render pages with such content.

Figure 4:
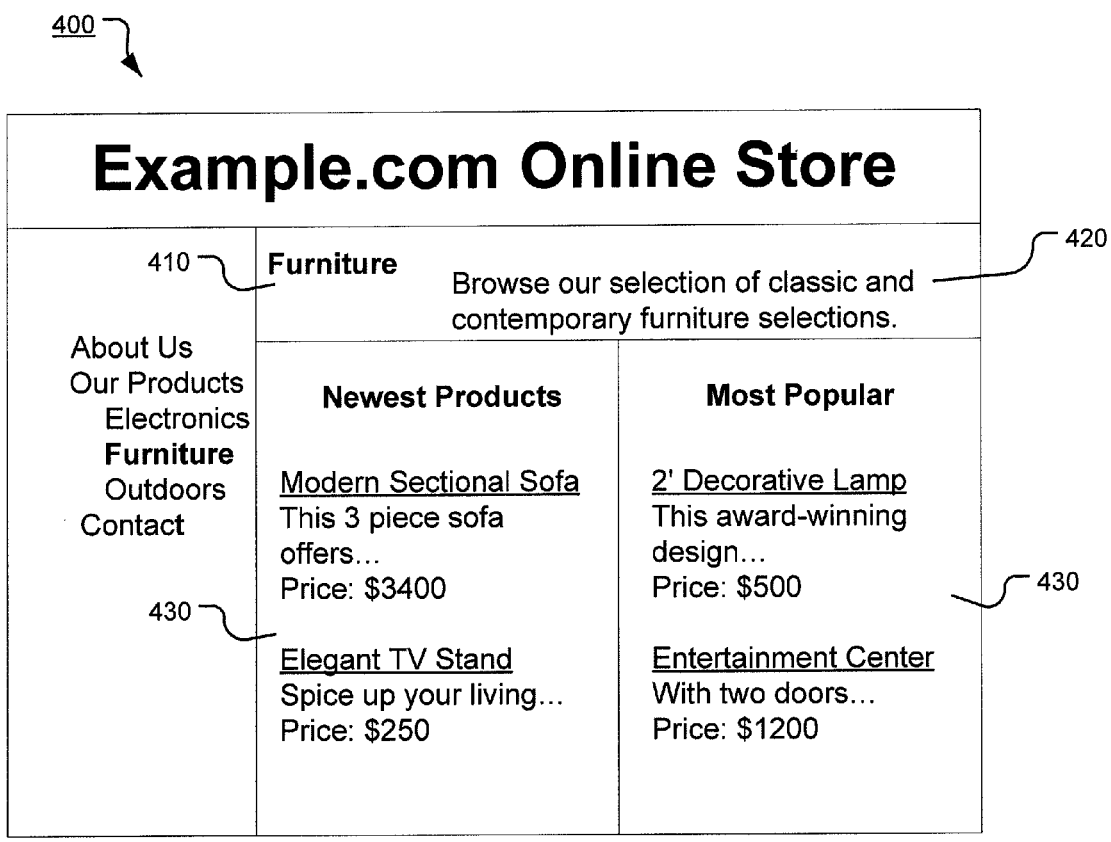
FIG. 4 illustrates an exemplary template page according to one or more embodiments.

With reference to FIG. 4, the example.com website may have three roll-up pages—one for each of "Electronics," "Furniture," and "Outdoors." The content on these pages is primarily constructed from search results for the particular category, such as, for example, "10 most popular items tagged as Electronics" or "10 most popular items tagged as Furniture." However, rather than creating and maintaining a separate page for each category, it is more efficient to create a single template page which is parameterized by the specific category keyword.

For example, instead of the physical URLs of "http://example.com/Pages/ElectronicsRollup.aspx," "http://example.com/Pages/FurnitureRollup.aspx," and "http://example.com/Pages/OutdoorRollup.aspx," a template page for each category might be structured as: "http://example.com/Pages/ProductsTemplate.aspx?Keyword=Electronics," "http://example.com/Pages/ProductsTemplate.aspx?Keyword=Furniture," and "http://example.com/Pages/ProductsTemplate.aspx?Keyword=Outdoors."

The web parts on the page (e.g. "10 most popular items tagged as X") will then by driven by a Keyword parameter. Additionally, the navigation term set allows multiple friendly URLs to be mapped to the same physical URL (i.e., a template page described above) while keeping the same friendly URLs of "http://example.com/products/electronics," "http://example.com/products/furniture," and "http://example.com/products/outdoors."

Such a configuration also minimizes management overhead. For example, if a new term "TVs" is added to the term set (i.e., as a child of "Electronics"), then an associated roll-up page is created automatically without requiring any special configuration effort from the user. Lastly, in contrast to a simple URL parameter such as "Keyword=Electronics", the Taxonomy system provides a natural store mechanism for additional template parameters such as a category image, a category description, etc.

Table 4 below illustrates a template where several different friendly URLs are mapped to or resolve to the same physical URL. In order to distinguish the URLs, a navigation term identifier may be appended to the Physical URL as part of the URL rewriting operation implemented by a web server. For example, a physical URL with term context parameters for the friendly URL "/products/furniture" could be "http://example.com/Pages/ProductsTemplate.aspx?TermStoreId=1001&TermSetId=3013&TermId=4017." Likewise, the physical URL with term context parameters for a friendly URL of "/products/outdoors" could be "http://example.com/Pages/ProductsTemplate.aspx?TermStoreId=1001&TermSetId=3013&TermId=4018" (where the terms in the term store of Table 1 above have been assigned term identifiers added in parenthesis as shown in Table 5 below).

Although URL rewriting is specifically mentioned, it is contemplated that the term identifier could be stored in a program variable that is readable by the controls on the web page. Regardless, the friendly URL maps to a taxonomy term, which is the input for various controls that display term-driven content on the page.

TABLE 4

| Menu Item | Friendly URL | Physical URL |
|---|---|---|
| "Home" | http://example.com | http://example.com/Pages/Default.aspx |
| "About Us" | http://example.com/about | http://example.com/Pages/Misc/About.aspx |
| "Our Products" | http://example.com/products | http://example.com/Pages/Products.aspx |
| "Electronics" | http://example.com/products/electronics | http://example.com/Pages/ProductsTemplate.aspx |
| "TVs" | http://example.com/products/electronics/tvs | http://example.com/Pages/ElectronicsTemplate.aspx |
| "Phones" | http://example.com/products/electronics/phones | http://example.com/Pages/ElectronicsTemplate.aspx |
| "Furniture" | http://example.com/products/furniture | http://example.com/Pages/ProductsTemplate.aspx |
| "Outdoors" | http://example.com/products/outdoors | http://example.com/Pages/ProductsTemplate.aspx |
| "Contact" | (none) | http://example.com/Forms/Contact.aspx |

TABLE 5

| Term Store | Term set | Term | Term |
|---|---|---|---|
| Example.com Store (Term Store ID = 1001) | | | |
| | Example.com Hierarchy (Term Set ID = 3013) | | |
| | | About Us (Term ID = 4014) | |
| | | Products (Term ID = 4015) | |
| | | | Electronics (Term ID = 4016) |
| | | | Furniture (Term ID = 4017) |
| | | | Outdoors (Term ID = 4018) |
| | | Contact (Term ID = 4019) | |

Referring again to FIG. 4, FIG. 4 illustrates an exemplary template page 400. Specifically, FIG. 4 illustrates an exemplary template paged called "ProductsTemplate.aspx" when the template page is driven by the "Furniture" term (having a term ID of 4017 as shown above in Table 5). The exemplary page acts as a template because the content of certain fields in the page changes according to a friendly URL associated with the template page. As shown in FIG. 4, the template page 400 includes: (i) a title field 410 that reads the navigation text from the term; (ii) a description field 420 that reads the hover text from the term and (iii) web parts 430 that perform searches to display the "10 newest" and "10 most popular" products associated with the term. Although specific fields are mentioned, it is contemplated that additional filed and/or arbitrary key/value data pairs can be stored with a taxonomy term. Such data enables users to assign their own application-specific data that can also be used to control the template page.

In addition to the above, embodiments provide a setting that enables child terms in the taxonomy to inherit a default physical URL from a parent term. For example, for a large catalog with hundreds of categories, it would be cumbersome to assign the same physical URL to each navigation term. Thus, in certain embodiments, a setting may be selected whereby a user may select a single physical URL for an entire sub-tree of child terms. In embodiments, this setting may be inherited by child terms created later.

This setting acts a default value that only applies if there is no explicit setting. For example, the e-commerce web site might use the same physical URL for all 100 product categories, except for two specific categories that have customized pages—embodiments disclosed herein allows this to be achieved by assigning values for only 3 terms, rather than having to assign values to all 100 terms.

To help manage these URLs, when editing a physical page, an editor provides an option whereby a user may view the various page URLs. Accordingly, the option displays to a user a diagnostic screen that displays the physical URL for the page alongside all of the associated friendly URLs.

When an author is viewing a friendly URL and enters a page editing mode, the user may be presented a prompt that asks: "You are about to edit a page that acts as a template for multiple Friendly URLs. Do you want your change to affect all friendly URLs, or do you want to edit a copy of the page for a single friendly URL?" The latter option creates a copy of the page template, and then binds the friendly URL to that page while all of the other friendly URLs remain bound to the original page. This provides a convenient way for the author to create custom content for a particular category, (e.g. for a seasonal promotion).

In a similar manner, when an author deletes a page with multiple friendly URLs, the author may be asked whether they want to delete the page template which will affect all associated friendly URLs or merely to delete the navigation term thereby affecting only a single friendly URL.

For simplicity, the examples presented herein involve a single navigation term set. However, embodiments provide for multiple navigation term sets to be active simultaneously. For example, the navigation menu at the top of the page might provide an overall hierarchy for the entire web site, whereas the left menu might provide a specialized hierarchy for a particular section. Accordingly, friendly URLs from two different term sets may be bound to the same target page (i.e. the same physical URL). This is supported by using a compound key consisting of the TermStoreId, TermSetId, and TermId, rather than specifying only the TermId.

FIGS. 5A and 5B illustrate exemplary user interfaces 500A and 500B for displaying and editing the properties of a taxonomy term including physical URLs and Default Physical URLs for a given page. Specifically, FIGS. 5A and 5B show an exemplary user interface that displays properties of two different friendly URL terms for editing (i.e., FIGS. 5A and 5B show the same interface but with two different terms loaded into the interface for editing). As shown in each figure, each term contributes only a single segment of the URL, and the full friendly URL is built up by prepending the segments from the chain of parent terms. Additionally, the user does not need to assign the "Physical URL for This Term" setting for every single term. By assigning the "Default Physical URL for Child Terms" a user can specify a single URL that affects an entire sub-tree. For example, because the term "Electronics" is a child of the term "Products", each term may have the same single URL (e.g., "http://example.com/Pages/ProductsTemplate.aspx"). However, certain embodiments provide that this feature can be overridden. In such cases, such as shown in the example in FIG. 5B, the physical URL for the "Electronics" term is "http://example.com/Pages/ProductsTemplate.aspx" while the default physical URL for child terms (i.e., TVs, Phones, etc.) is "http://example.com/Pages/ElectronicsTemplate.aspx."

Embodiments also disclose commerce web sites which are modeled using the taxonomy features described herein. Specifically, embodiments disclosed herein allow online vendors to construct a new model that allows product descriptions to exist in a product catalog, or list, while the site hierarchy and URL structure are managed and modeled in a taxonomy system. Thus, rather than displaying an existing HTML page for a given product, a query using the current taxonomy term navigation context is executed. The query can be modified in real time by the use of query rules and properties associated to the terms in the taxonomy system.

Embodiments herein provide for catalog URLs that are based on friendly URLs. In embodiments, the catalog URS are based on a specific item, such as, for example an SKU number of a particular product, a description of the product and the like. Continuing the example above, a friendly URL for the example.com furniture site may be "http://example.com/products/furniture" while a catalog URL for a specific item, such as, for example a red sofa, may be "http://example.com/products/furniture/sku01096/red-sofa."

Figure 6:
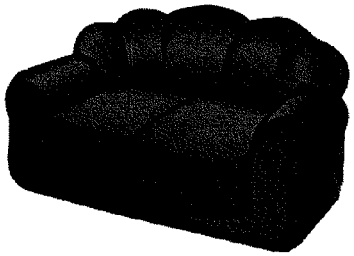
FIG. 6 illustrates an exemplary web page for a given item in a product catalog according to one or more embodiments.

As discussed above, catalog URL (e.g. "/Pages/ItemTemplate.aspx", as shown in FIG. 6) is based on a friendly URL (e.g. "/Pages/ProductsTemplate.aspx", as shown in FIG. 4), but with an additional suffix ("sku01096/red-sofa") that does not correspond to terms in the hierarchy. For example, there is not a taxonomy term "red-sofa" nor a term "sku1096," but rather these segments of the URL are constructed from the Title field ("Red Sofa") and Item Number field ("SKU1096") for the catalog item. The catalog item is tagged with the "Furniture" term by assigning the Item Category taxonomy field. Accordingly, embodiments herein provide that the taxonomy term "Furniture" will now have two different physical pages specified for it. Namely, a template page for a friendly URL (e.g., "/Pages/Products.aspx") and a template page for Catalog URL (e.g., "/Pages/ItemTemplate.aspx"). Table 6 below shows example mappings between menu items, friendly URLs, physical URLs and associated Catalog URLs.

TABLE 6

| Menu Item | Friendly URL | Physical URL | Catalog URL |
| --- | --- | --- | --- |
| "Home" | / | /Pages/Default.aspx | (none) |
| "About Us" | /about | /Pages/Misc/About.aspx | (none) |
| "Our Products" | /products | /Pages/Products.aspx | (none) |
| "Electronics" | /products/electronics | /Pages/ProductsTemplate.aspx | /Pages/ItemTemplate.aspx |

TABLE 6-continued

| Menu Item | Friendly URL | Physical URL | Catalog URL |
| --- | --- | --- | --- |
| "TVs" | /products/electronics/tvs | /Pages/ElectronicsTemplate.aspx | /Pages/ItemTemplate.aspx |
| "Phones" | /products/electronics/phones | /Pages/ElectronicsTemplate.aspx | /Pages/ItemTemplate.aspx |
| "Furniture" | /products/furniture | /Pages/ProductsTemplate.aspx | /Pages/ItemTemplate.aspx |
| "Outdoors" | /products/outdoors | /Pages/ProductsTemplate.aspx | /Pages/ItemTemplate.aspx |
| "Contact" | (none) | /Forms/Contact.aspx | (none) |

FIG. 6 illustrates an exemplary web page 600 for a given item in a product catalog. As shown in FIG. 6, a page corresponding to a particular item may include item properties such as, a SKU number, a rating, an item title (e.g., "Red Sofa") and the like. In certain embodiments, the item properties may be used to generate the suffix for the catalog URL.

As discussed above, the templates for the friendly URL and the catalog URL show different content depending on the URL. For the friendly URL, the template is driven by the term in the hierarchy (e.g. "Furniture"), which is identified using ID's that get appended when the URL is rewritten. Thus, for example, the physical URL associated with the friendly URL may be written as: "http://example.com/Pages/ProductsTemplate.aspx?TermStoreId=1001&TermSetId=3013&TermId=4017."

For the catalog URL, the template is driven by the term as well as the suffix (e.g., sku1096/red-sofa). An exemplary URL may be written as: "http://example.com/Pages/ItemTemplate.aspx?TermStoreId=1001&TermSetId=3013&TermId=4017&UrlSuffix=/sku01096/red-sofa." In certain embodiments, the suffix may be a SKU number of a particular product, a given name of the particular product, or an arbitrary number assigned by the user (i.e., listed in product database). In sum, a user is given the choice as to how the ending portion of the friendly URL is to appear. For example, a user may wish to use a friendly name of a particular item (e.g., "Sofa") so that the item and its associated friendly URL may be discovered when the term "Sofa" is input in a search engine. In certain embodiments, the text that appears at the end of the friendly URL is a property of the term to which the product relates to. For example, "Sofa" may be a property of the term "Furniture" in the term store.

In embodiments, the controls on a template page such as page 600, can interpret a UrlSuffix parameter in different ways. For example, for an image gallery scenario, some customized controls might see a URL like "UrlSuffix=/Brown-Bear", and then follow a mapping to display an image resource at "example.com/Images/BrownBear.jpg". For a blog scenario, the customized controls might see "UrlSuffix=/2012/01/02/MyThoughtsToday" and extract the date Jan. 2, 2012, and then display the blog posting from that day.

Behind the scenes, the mapping is interpreted both as a forward rule (i.e., a catalog URL points to an item to display) and as a reverse rule (i.e., an item points to a catalog URL). For example, when the search engine crawls the catalog, it may only see the raw item information (e.g. "Red Sofa" and "sku01096"). In order to display the search results on the page, a rule is applied to reassemble the fields into a complete catalog URL.

FIG. 7A illustrates an exemplary user interface 700 for displaying and editing the properties of a taxonomy term including catalog URLs according to one or more embodiments. As shown in FIG. 7A, the user interface 700 may display the properties of a friendly URL versus a catalog URL mapping. In embodiments, the user does not need to assign the "Catalog Page for This Term" setting for every single term. By assigning the "Default Catalog Page for Child Terms" the user can specify a single URL that affects an entire sub-tree although this can be overridden where necessary. Additionally, as shown in FIG. 7A, the "Navigation Menu Item Title" text input box contains text that is different from the actual "Taxonomy Term Name" as the "Customize" option has been selected. Accordingly, the phrase "Our Products" will show up in a menu item on the webpage instead of the actual term name "Products."

FIG. 7B illustrates an exemplary user interface 750 for editing catalog item properties in a product database. For example, user interface 750 shows that the item "Red Sofa" appears in the product catalog database. However, because "Red Sofa" is a particular item, it does not have an associated term in the term set. As such, the item "Red Sofa" is tagged with the term "Furniture" as shown in "Item Category" field of FIG. 7B (i.e., the "Item Category" field has a new assigned value of "Furniture"). Tagging the item in such a way causes the item "Red Sofa" to be part of the "Furniture" category in the taxonomy. There is no taxonomy term called "Red Sofa". As also shown, the user interface enables a user to set a unique title, item number, image, and the like for each specific item.

In embodiments, one or more fields in the user interface 750 are used to append the one or more suffixes to the friendly URL. For example, the "Item Number" field will create the "sku01096" part of a URL, and the "Title" field will create a "red-sofa" part of the URL. If the "Title" field was added first, then the URL would be "/products/furniture/red-sofa/sku01096". However, if the "Item Number" field was not added at all to the user interface 750, the URL would be "/products/furniture/red-sofa/".

Figure 8:
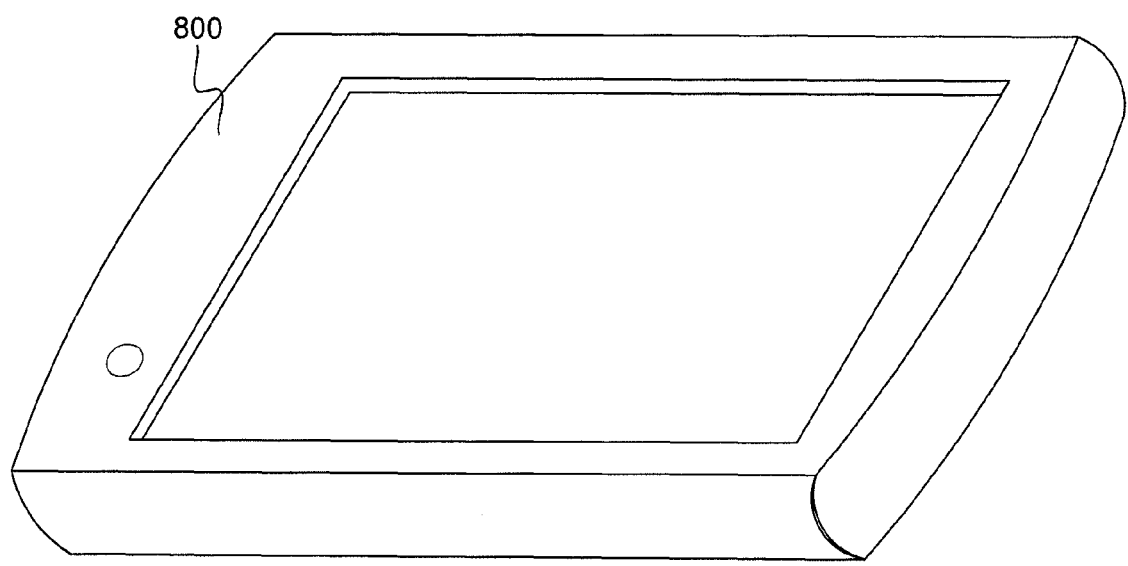
FIG. 8 illustrates a tablet computing device for executing one or more embodiments of the present disclosure.
Figure 9:
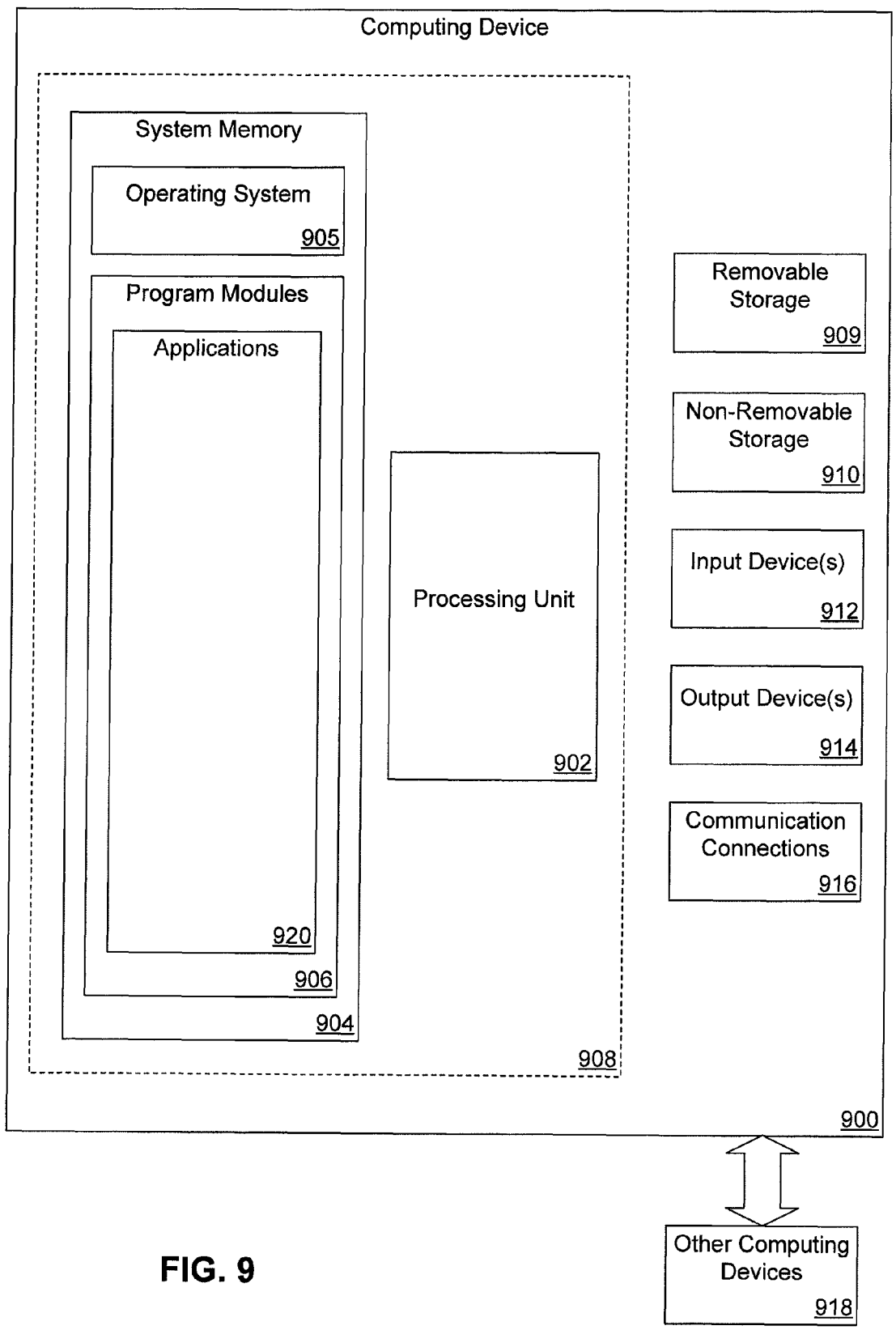
FIG. 9 illustrates a block diagram of a computing environment suitable for implementing one or more embodiments disclosed herein.

The embodiments and functionalities described herein may operate via a multitude of computing systems including, without limitation, wired and wireless computing systems, mobile computing systems (e.g., mobile telephones, netbooks, tablet or slate type computers, and laptop computers). FIG. 8 illustrates an exemplary tablet computing device 800 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9 through 11 and the associated descriptions provide a discussion of a variety of operating environments in which embodiments of the present disclosure may be practiced. However, the devices and systems illustrated and discussed with respect to FIGS. 9 through 11 are for purposes of example and illustration and are not limiting of a vast number of computing device configurations that may be utilized for practicing embodiments of the present disclosure, described herein.

FIG. 9 is a block diagram illustrating exemplary physical components of a computing device 900 with which embodiments of the present disclosure may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination. The system memory 904 may include an operating system 905, one or more program modules 906, which are suitable for running applications 920. The operating system 905, for example, may be suitable for controlling the operation of the computing device 900. Furthermore, embodiments of the present disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 may perform processes including, for example, one or more of the stages of the methods described herein. The aforementioned process is an example, and the processing unit 902 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the present disclosure, program modules may include routines, programs, components, data structures, and other types of structures that may perform particular tasks or that may implement particular abstract data types. Moreover, embodiments of the present disclosure may be practiced with other computer system configurations, including hand-held devices, multiprocessor systems, microprocessor-based or programmable consumer electronics, minicomputers, mainframe computers, and the like. Embodiments of the present disclosure may also be practiced in distributed computing environments where tasks are performed by remote processing devices that are linked through a communications network. In a distributed computing environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 900 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 904, the removable storage device 909, and the non-removable storage device 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 900. Any such computer storage media may be part of the computing device 900. The computing device 900 may also have one or more input device(s) 912 such as a keyboard, a mouse, a pen, a sound input device, a touch input device, etc. The output device(s) 914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, or serial ports, and other connections appropriate for use with the applicable computer readable media.

Figure 10A:
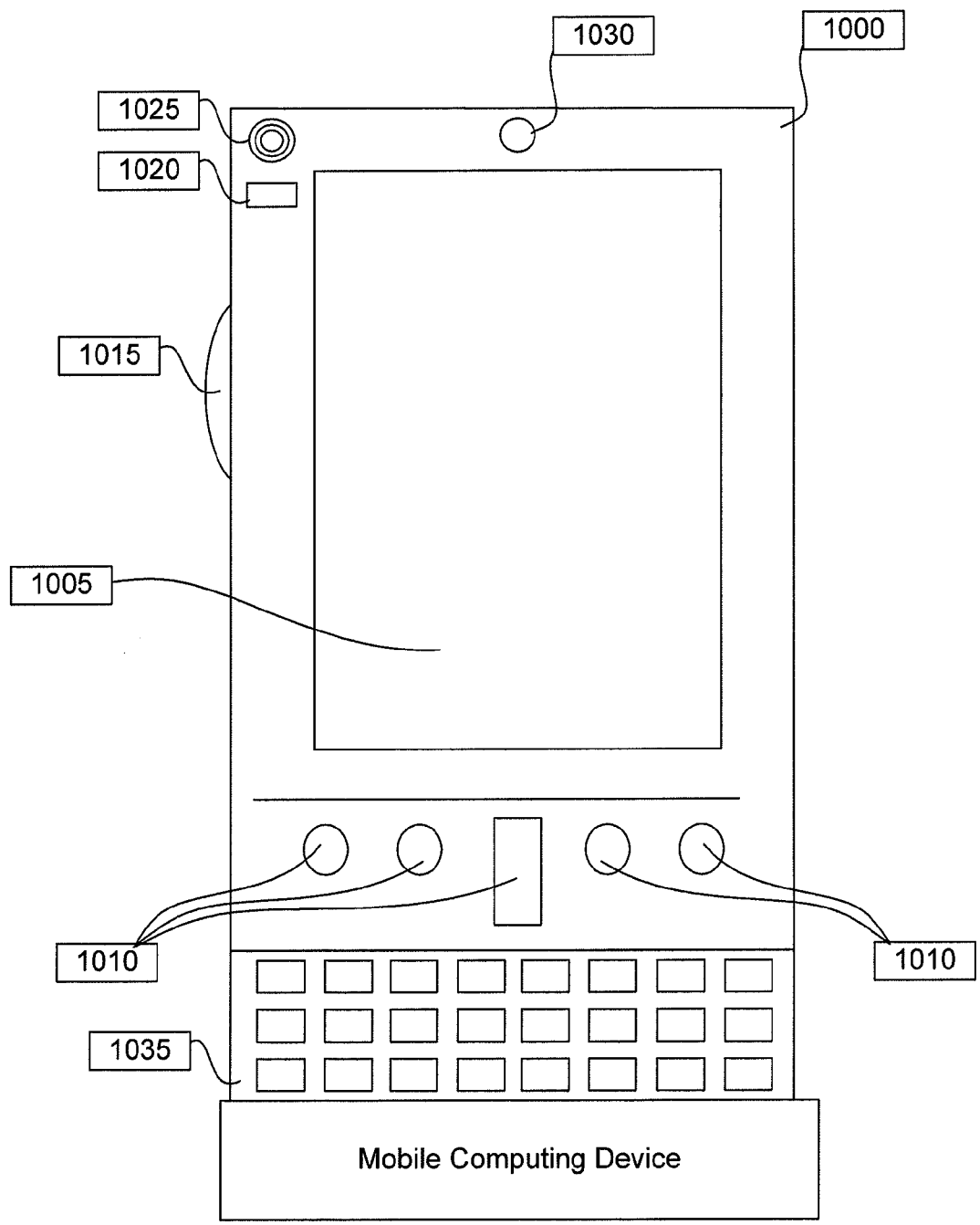
FIG. 10A illustrates one embodiment of a mobile computing device executing one or more embodiments disclosed herein.
Figure 10B:
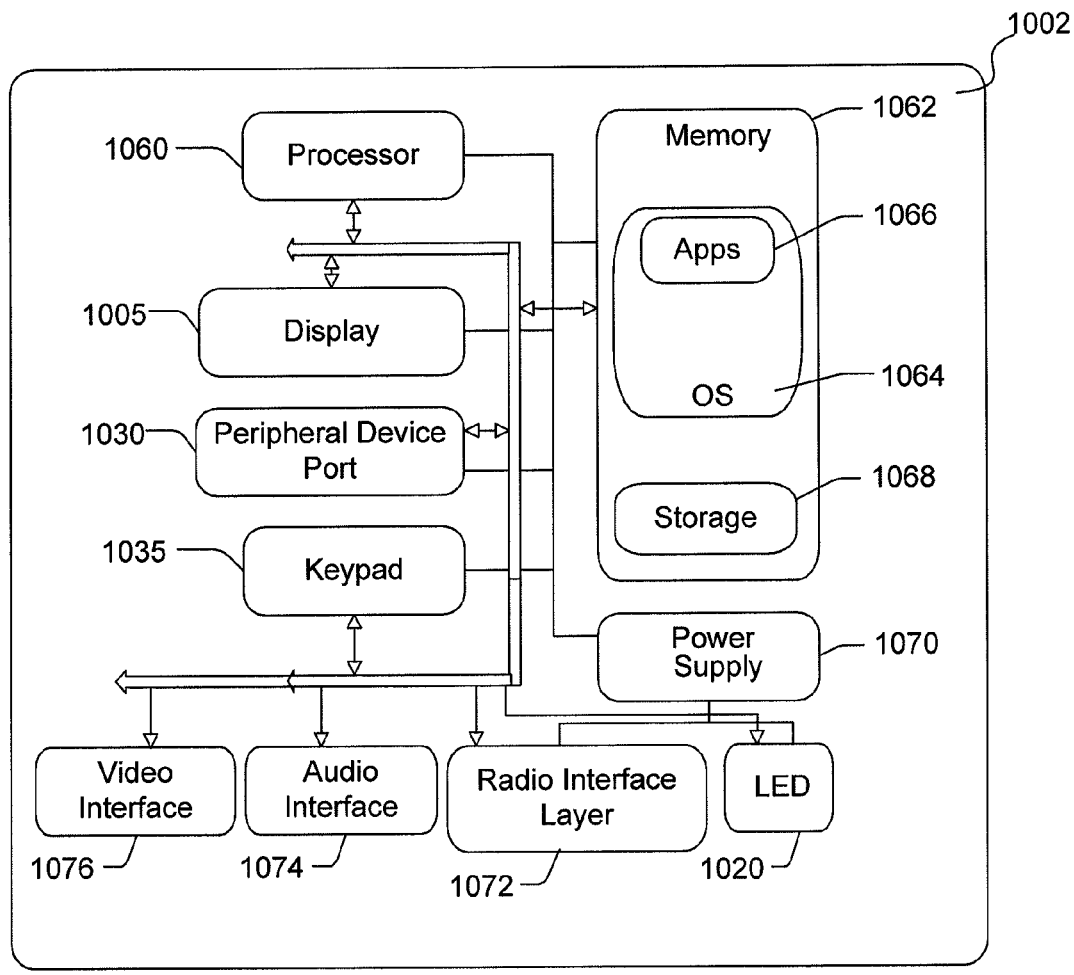
FIG. 10B is a simplified block diagram of an exemplary mobile computing device suitable for practicing one or more embodiments disclosed herein.
Figure 11:
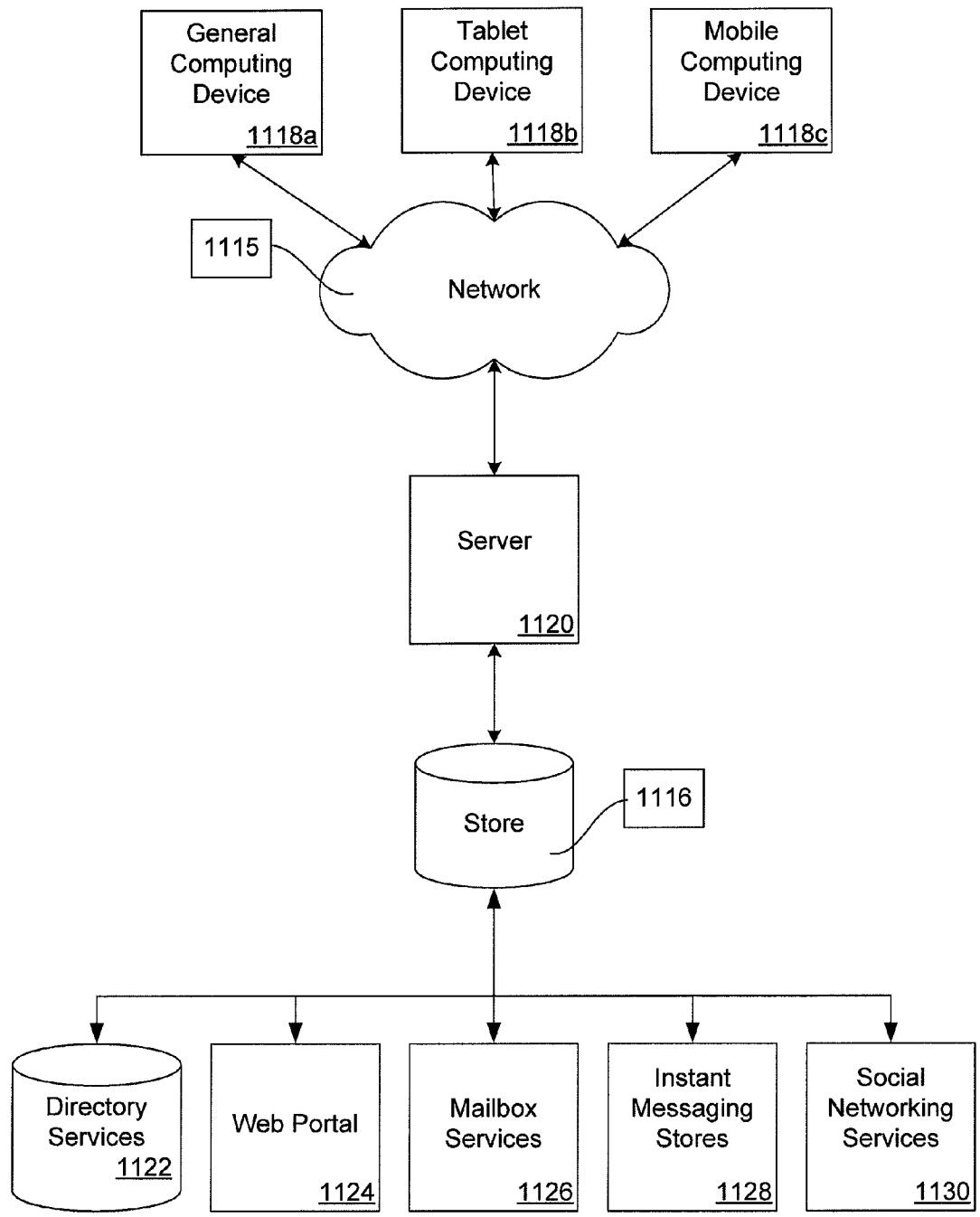
FIG. 11 is a simplified block diagram of an exemplary distributed computing system suitable for practicing one or more embodiments disclosed herein.

FIGS. 10A and 10B illustrate a mobile computing device 1000, for example, a mobile telephone, a smart phone, a tablet personal computer, a laptop computer, and the like, with which embodiments of the present disclosure may be practiced. With reference to FIG. 10A, an exemplary mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 1000, in alternative embodiments, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 10B is a block diagram illustrating the architecture of one embodiment of a mobile computing device. That is, the mobile computing device 1000 can incorporate a system (i.e., an architecture) 1002 to implement some embodiments. In one embodiment, the system 1002 is implemented as a "smart phone" capable of running one or more applications (e.g., browser, e-mail, calendaring, contact managers, messaging clients, games, and media clients/players). In some embodiments, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 that performs the function of transmitting and receiving radio frequency communications. The radio 1072 facilitates wireless connectivity between the system 1002 and the "outside world", via a communications carrier or service provider. Transmissions to and from the radio 1072 are conducted under control of the operating system 1064. In other words, communications received by the radio 1072 may be disseminated to the application programs 1066 via the operating system 1064, and vice versa.

The radio 1072 allows the system 1002 to communicate with other computing devices, such as over a network. The radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1002 provides notifications using the visual indicator 1020 that can be used to provide visual notifications and/or an audio interface 1074 producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068. Computer storage media may include volatile and nonvolatile, removable and non-removable media implemented in any method or technology for storage of information, such as computer readable instructions, data structures, program modules, or other data.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 illustrates one embodiment of the architecture of a system for providing converted documents to one or more client devices, as described above. In certain embodiments, the converted documents may be stored in different communication channels or other storage types. For example, various documents, including the converted documents, may be stored using a directory service 1122, a web portal 1124, a mailbox service 1126, an instant messaging store 1128, or a social networking site 1130. The various components of the system 100 use any of these types of systems or the like for enabling data utilization, as described herein. A server 1120 may provide the converted paragraphs to clients. The server 1120 may provide the converted paragraphs and the status updates over the web to clients through a network 1115. By way of example, the client computing device 1118 may be implemented as the computing device 1100 and embodied in a personal computer 1118a, a tablet computing device 1118b and/or a mobile computing device 1118c (e.g., a smart phone). Any of these embodiments of the client computing device 1118 may obtain content from the store 1116. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method comprising:
   receiving a plurality of terms for a term set;
   generating a hierarchical taxonomy for the term set using the plurality of terms;
   assigning a navigation property to at least one term in the plurality of terms;
   generating a navigation term set using the at least one term, wherein properties of the navigation term set mirrors the properties of the hierarchical taxonomy;
   associating properties for a navigation tree node and a uniform resource locator having a base uniform resource locator, with the at least one term in the generated navigation term set;
   generating a friendly uniform resource locator for a website by appending the at least one term from the navigation term set to the base uniform resource locator according to a hierarchical order that is determined based on the associated properties;
   providing the friendly uniform resource locator for access to the website;
   receiving an update to the at least one term in the navigation term set, wherein the update to the at least one term automatically triggers update to the navigation tree node and the friendly uniform resource locator; and
   in response to receiving the update, providing an updated friendly uniform resource locator for access to the website.

2. The method of claim 1, further comprising receiving a request to access a page of the website, and wherein the providing of the updated friendly uniform resource location provides the updated friendly uniform resource locator in response to the received request.

3. The method of claim 1, further comprising mapping the friendly uniform resource locator to a physical uniform resource locator.

4. The method of claim 1, wherein the hierarchical order is used to append two or more terms from the navigation term set to the base uniform resource locator determined based on the associated properties for the navigation tree node.

5. The method of claim 1, wherein the generating further comprises generating at least two friendly uniform resource locators for the website based on the associated properties, and the providing selectively determines a friendly uniform resource locator to provide from the at least two friendly uniform resource locators based on a received request corresponding to a page of the website.

6. The method of claim 1, wherein the at least one term is associated with a menu item in a navigation menu tree of the website, wherein the website is associated with the navigation term set.

7. The method of claim 1, further comprising:
receiving an update to a property of the at least one term; and
automatically updating the menu item associated with the at least one term.

8. The method of claim 1, further comprising:
receiving an update to the navigation property of the at least one term; and
automatically updating the friendly uniform resource locator associated with the at least one term.

9. The method of claim 8, wherein updating a friendly uniform resource locator associated with the at least one term comprises updating one or more additional friendly uniform resource locators that refer to and depend from the friendly uniform resource locator.

10. A computer-readable storage device encoding computer executable instructions that, when executed by one or more processors, perform a method for generating a uniform resource locator using one or more terms in a hierarchical taxonomy, the method comprising:
receiving a plurality of terms for a term set;
generating a hierarchical taxonomy for the term set using the plurality of terms;
assigning a navigation property to at least one term in the plurality of terms;
generating a navigation term set using the at least one term, wherein properties of the navigation term set mirrors the properties of the hierarchical taxonomy;
associating properties for a navigation tree node and a uniform resource locator having a base uniform resource locator, with the at least one term in the generated navigation term set;
generating a friendly uniform resource locator for a website by appending the at least one term from the navigation term set to the base uniform resource locator in accordance with a hierarchical order that is determined based on the associated properties for the navigation tree node;
providing the friendly uniform resource locator for access to the website;
receiving an update to the at least one term in the navigation term set, wherein the update to the at least one term automatically triggers update to the navigation tree node and the friendly uniform resource locator; and
in response to receiving the update, providing an updated friendly uniform resource locator for access to the website.

11. The computer-readable storage device of claim 10, further comprising instructions for receiving a request to access a page of the website, and wherein the providing of the updated friendly uniform resource locator provides the updated friendly uniform resource locator in response to the received request.

12. The computer-readable storage device of claim 10, further comprising instructions for mapping the friendly uniform resource locator to a physical uniform resource locator.

13. The computer-readable storage device of claim 10, wherein the hierarchical order is used to append two or more terms from the navigation term set to the base uniform resource locator based on the associated properties for the navigation tree node.

14. The computer-readable storage device of claim 10, further comprising instructions for generating at least two friendly uniform resource locators for the website based on the associated properties, and wherein the providing selectively determines a friendly uniform resource locator to provide from the at least two friendly uniform resource locators based on a received request corresponding to a page of the website.

15. The computer-readable storage device of claim 10, wherein the at least one term is associated with a menu item in a navigation menu tree of the website, wherein the website is associated with the navigation term set.

16. The computer-readable storage device of claim 15, further comprising instructions for:
receiving an update to a property of the at least one term; and
automatically updating the menu item associated with the at least one term.

17. The computer-readable storage device of claim 10, further comprising instructions for:
receiving an update to the navigation property of the at least one term; and
automatically updating the friendly uniform resource locator associated with the at least one term.

18. A system comprising:
one or more processors; and
a memory coupled to the one or more processors, the memory for storing instructions which, when executed by the one or more processors, cause the one or more processors to perform a method for generating a uniform resource locator using one or more terms in a hierarchical taxonomy, the method comprising:
receiving a plurality of terms for a term set;
generating a hierarchical taxonomy for the term set using the plurality of terms;
assigning a navigation property to at least one term in the plurality of terms;
generating a navigation term set using the at least one term, wherein properties of the navigation term set mirrors the properties of the hierarchical taxonomy;
associating properties for a navigation tree node and a uniform resource locator having a base uniform resource locator, with the at least one term in the generated navigation term set;
generating a friendly uniform resource locator using the at least one term in the navigation term set, wherein the friendly uniform resource locator is generated by appending the at least one term from the navigation term set to the base uniform resource locator in accordance with a hierarchical order that is determined based on the associated properties for the navigation tree node;
providing the friendly uniform resource locator for access to the website;
receiving an update to the at least one term in the navigation term set, wherein the update to the at least one term automatically triggers update to the navigation tree node and the uniform resource locator; and
upon receiving the update, providing an updated friendly uniform resource locator for access to the website.

19. The system of claim 18, wherein the method further comprising receiving a request to access a page of the website, and wherein the providing of the updated friendly uniform resource location provides the updated friendly uniform resource locator in response to the received request.

20. The system of claim 18, wherein the generating further comprises generating at least two friendly uniform resource locators for the website based on the associated properties, and the providing selectively determines a friendly uniform resource locator to provide from the at least two friendly uniform resource locators based on a received request corresponding to a page of the website.

* * * * *